UNITED STATES PATENT OFFICE.

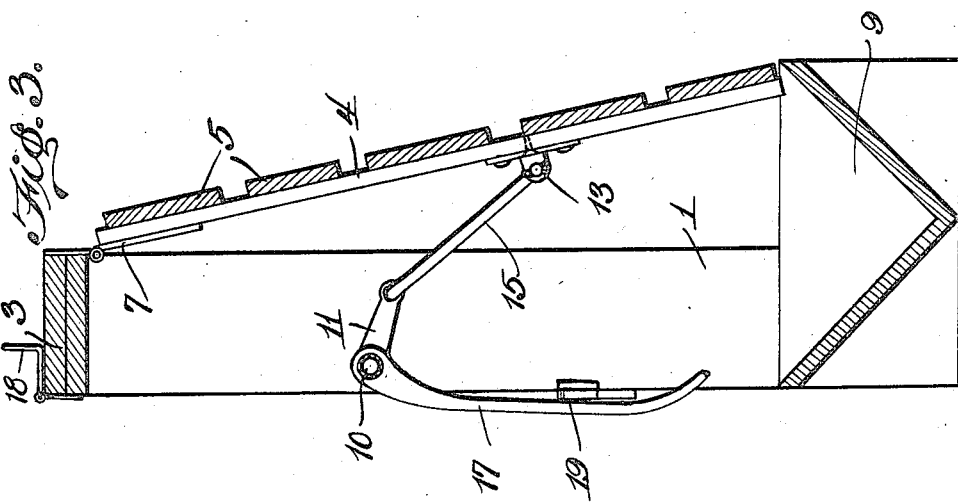
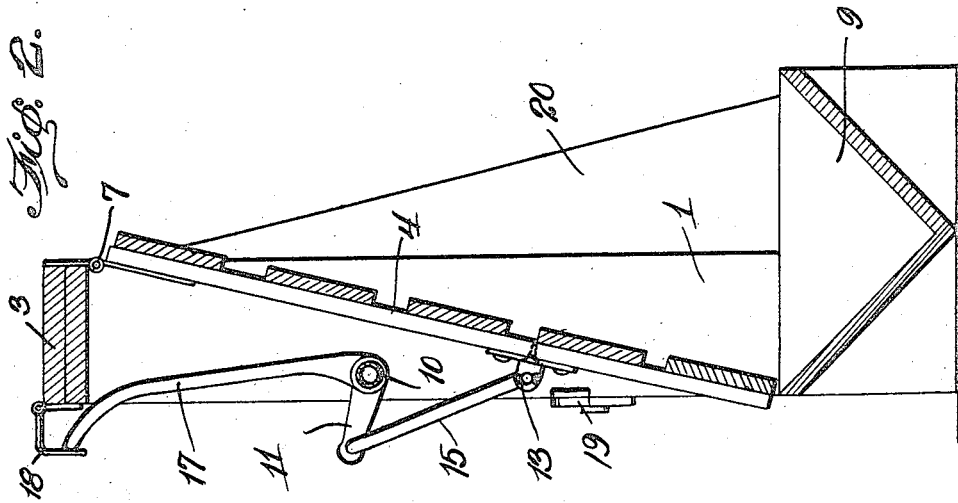

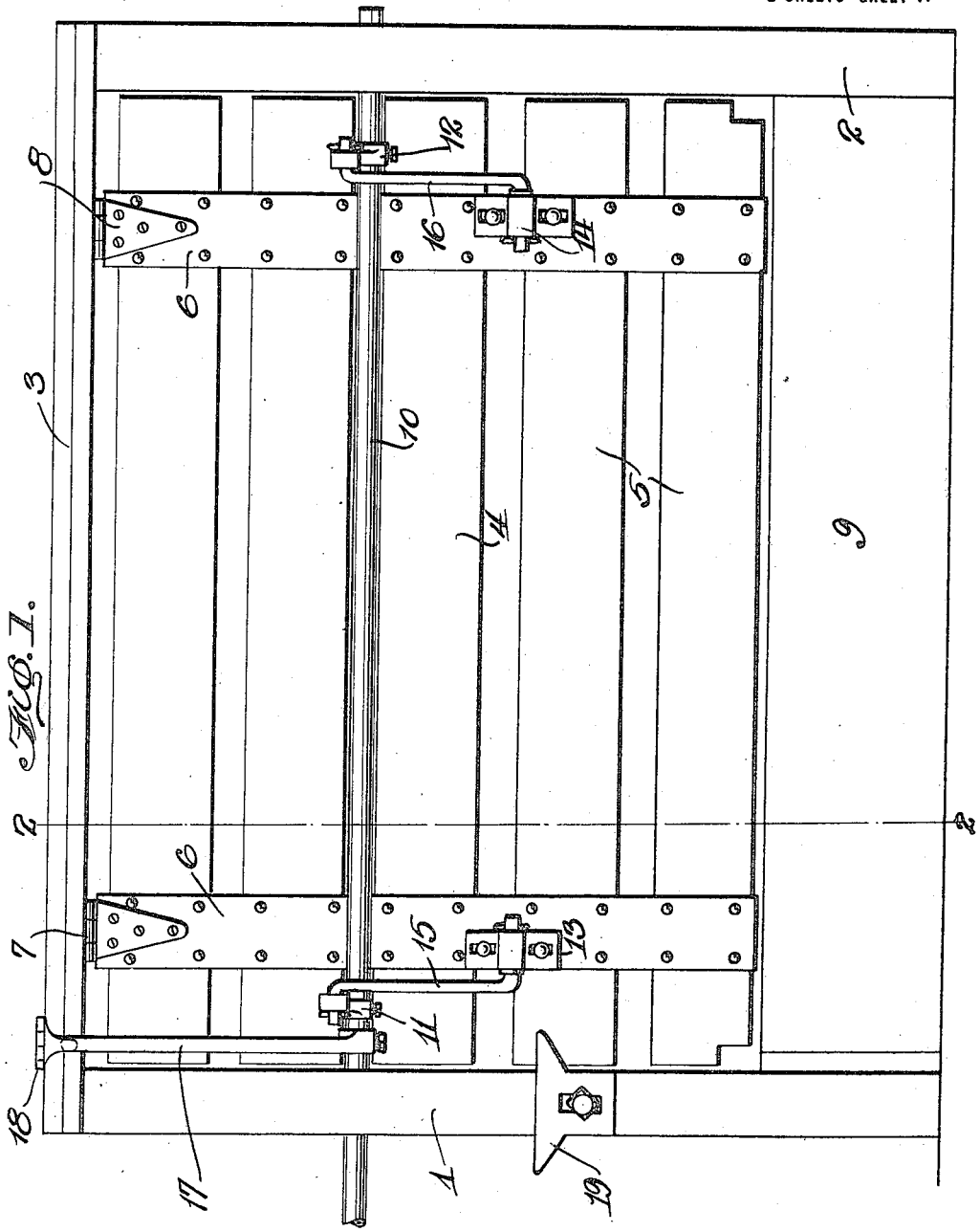

MICHAEL W. AHERN, OF FOUNTAIN, MINNESOTA.

FEEDING-GATE.

1,261,991.　　　　Specification of Letters Patent.　　Patented Apr. 9, 1918.

Application filed January 12, 1917. Serial No. 142,034.

*To all whom it may concern:*

Be it known that I, MICHAEL W. AHERN, a citizen of the United States, residing at Fountain, in the county of Fillmore and State of Minnesota, have invented certain new and useful Improvements in Feeding-Gates, of which the following is a specification.

My invention relates to an improvement in feeding gates, and more particularly to such a gate as is adapted to be mounted adjacent a feeding trough for swine or other animals, and which is so constructed that it may be swung to a relation to either side of the trough to permit the animals to have access to the trough or to exclude them from the trough.

An object of the invention is to provide means by which the gate may be manually swung to either of its operative relations, and to so mount the gate that it may be constructed as a portion of an inclosing fence and when swung to either of its positions will still be operative to confine the animal within the inclosure.

A further object lies in providing means in conjunction with the manually operable means and also so constructed with the manually operable means that the gate will be positively held in its adjusted position.

With the above and other objects in view, my invention consists in certain other novel features of construction and combinations of parts which will be hereinafter set forth in connection with the drawings and then more particularly pointed out in claims.

In the drawings:

Figure 1 is a view in rear elevation of the device of my invention.

Fig. 2 is a transverse sectional view taken on the line 2—2 of Fig. 1 with the parts shown in the relation in which access may be had to the trough.

Fig. 3 is a view similar to Fig. 2 but showing the parts in their other extreme position from the disclosure in Fig. 2.

The main supporting structure comprises the upright posts 1 and 2, which for that matter might be posts at the ends of a fence in which the gate is mounted, and a cross bar 3 is connected between these posts 1 and 2 to be supported at the upper ends thereof. The gate 4 comprises the cross members 5 which are joined by the cleats 6 positioned adjacent the ends of the members 5. Hinges 7 and 8 are connected with the cleats 6 at each end of the gate structure and are mounted on the cross bar 3 so that the gate is held suspended from this cross bar and is adapted to swing between the upright supporting posts 1 and 2.

A trough 9, which may be of wood, metal, or other suitable material is mounted between the posts 1 and 2 in such relation that its transverse center is substantially vertically beneath the mounting of the hinges 7 and 8 on the cross bar 3, these hinges being secured on the inner side of the cross bar 3 as is better shown in Figs. 2 and 3, and the trough 9 being thus thrown somewhat inwardly from the posts 1 and 2. By this positioning of the trough 9, as the gate 4 is swung around its mounting on the hinges 7 and 8, it will clear the side edges of the trough but only slight clearance is given as the gate is moved to either of the positions shown in Figs. 2 and 3. In either of these positions there will not be sufficient space between the outer edges of the trough and the lower edge of the gate that an animal could escape therebetween, however, as the gate might be given further movement in either direction the space would be widened between the gate and the edges of the trough and in consequence it is essential that means be provided to maintain the gate in each of the positions as shown in the drawings.

A shaft 10, which may be in the form of a hollow tube is journaled in suitable bearing openings or in suitable bearings on the posts 1 and 2, and arms 11 and 12 are secured on the shaft adjacent the posts 1 and 2. Bearing members 13 and 14 are mounted on the cleats or battens 6 at each end of the gate and the links 15 and 16 are connected between these bearings 13 and 14 and the arms 11 and 12. An operating lever 17 is connected on the shaft 10 to turn therewith, and as the operating lever 17 is given swinging movement, the arms 11 and 12 will be correspondingly swung, and through the connection of the links 15 and 16 with the gate, movement will be transmitted to the gate structure as an entirety.

As the operating lever 17 is swung to the vertically upwardly disposed relation as shown in Fig. 2, the gate 4 is moved to such a relation that the lower end thereof is adjacent the outer edge of the trough 9 and consequently access may be had to the trough by the pigs or other animals which are to be fed therefrom, however, due to the fact that the arms 11 and 12 have been raised to swing the gate to this relation and a downward pressure is being exerted upon these arms through the links 15 and 16, means must be provided to hold the operating lever 17 in this raised relation, and for this purpose I provide the catch 18 which is hinged or otherwise mounted on the cross bar 3 to drop down or swing down over the outer end of the operating lever 17. When the catch 18 is engaged in the relation shown in Fig. 2, the operating lever 17 will be positively held against return movement under the weight exerted upon the arms 11 and 12, and the gate 4 will be retained in the relation shown until the catch 18 is manually released. When the catch 18 has been released, the gate 4 will through its own weight swing to hang in a substantially vertical relation, and in this positioning the gate would not be fully effective to close access to the trough, therefore it is necessary that the gate 4 shall be swung past the position which it occupies when moving under its own weight, and the arms 11 and 12 are extended from the shaft 10 in such relation that as the operating lever 17 is brought to extend vertically downwardly from the shaft, the arms 11 and 12 will have their point of pivotal connection with the links 15 and 16 raised past a dead center from the shaft 10 to the bearings 13 and 14. When the parts have been brought to this relation, the tendency is for the arms 11 and 12 to be swung upwardly, and to overcome this tendency the stop 19 is mounted on the post 1 to be engaged by the operating lever 17 and to prevent further turning of the shaft 10. When the gate 4 is swung to the relation shown in Fig. 3, a space is left between the end edges thereof and the posts 1 and 2 due to the mounting of the hinges 7 and 8 on the inner side of the cross bar 3 and consequently a space is permitted through which the animals might escape from the inclosure or in which the heads or legs of the animals might be caught, and to overcome this objection the substantially wedge shaped filler members 20 are placed at the ends of the trough and against the posts 1 and 2.

In the use of the device, the cross bar 3 and the shaft 10 will be mounted on fence posts which are already in place or posts might be constructed especially for the device, and after the trough 9 has been mounted or constructed in the positioning as shown, the remaining parts of the structure may be positioned at the proper points and the device is then ready for operative use.

When the gate 4 is thrown to the position shown in Fig. 3, the animals are not permitted to have access to the trough 9 and also the gate acting in conjunction with the forward side of the trough 9 and the filler members 20 will close the opening in which the gate swings against the passage of animals. As the operating lever 17 is swung outwardly and upwardly to the position shown in Fig. 2, the gate 4 will be moved so that its lower edge is disposed above the outer edge of the trough and consequently the animals are permitted to have access to the trough. When the gate is thrown forwardly, slops, grain, or other feed may be placed in the trough from the outside of the inclosure.

While in the present instance I have shown only a single gate, it will be understood that a number of troughs might be mounted end to end with the gates and other structure mounted in a relation corresponding to the showing in the drawings and that by connecting the shafts 10, the several gates might be simultaneously operated by the manipulation of a single operating lever 17, and further it will be seen that other changes and modifications in both the arrangement and the formation of the parts might be resorted to without departing from the spirit and scope of my invention, and hence I do not wish to be limited to the exact disclosure but to such points as may be set forth in the claims.

I claim:

1. In combination with a feeding trough, upright posts mounted adjacent the ends of said trough, a cross bar mounted on said posts, a gate hingedly mounted on the cross bar at a point substantially vertically above the center of the trough and in such relation that as the gate is swung the lower edge thereof will move adjacent the inner and outer sides of the trough, a shaft connected between said upright posts, arms on said shaft, links from said arms to the gate, and an operating lever by which the shaft may be turned to swing the gate to have the lower edge thereof adjacent the outer side of the trough and to also allow swinging movement of the gate to bring the lower edge adjacent the rear edge of the trough.

2. In combination with a feeding trough, upright posts mounted adjacent the ends of said trough, a cross bar mounted on said posts, a gate hingedly mounted on the cross bar at a point substantially vertically above the center of the trough and in such relation that as the gate is swung the lower edge thereof will move adjacent the inner and outer sides of the trough, a shaft connected between said upright posts, arms on said shaft, links from said arms to the gate, an operating lever by which the shaft may be turned to swing the gate to have the lower edge thereof adjacent the outer side of the trough and to also allow swinging movement of the gate to bring the lower edge adjacent the rear end of the trough, and means to positively hold the gate in either of the operative positions.

3. In combination with a feeding trough, posts located at the ends of said trough, a gate hingedly mounted above the trough in such relation that as the gate is swung the lower edge thereof will move adjacent the inner and outer sides of the trough, a shaft journaled across between said posts and out of the swinging path of the gate, arms mounted on said shaft adjacent the ends of the gate, links connected with the free ends of said arms, a pivotal connection between said gate and the free ends of said links, and an operating lever secured on said shaft by which turning movement is imparted thereto to accomplish swinging of the gate.

4. In combination with a feeding trough, posts located at the ends of said trough, a gate hingedly mounted above the trough in such relation that as the gate is swung the lower edge thereof will move adjacent the inner and outer sides of the trough, a shaft journaled across between said posts and out of the swinging path of the gate, arms mounted on said shaft adjacent the ends of the gate, links connected with the free ends of said arms, a pivotal connection between said gate and the free ends of said links, an operating lever secured on said shaft by which turning movement is imparted thereto to accomplish swinging of the gate, and movable means to engage with said operating lever and to hold the same in such positions that the gate is secured in adjusted positions adjacent the inner and outer edges of the trough as may be desired.

5. In combination with a feeding trough, posts located at the ends of said trough, a gate hingedly mounted in conjunction with said posts to be capable of swinging movement on a horizontal axis and to have the free edge thereof swung adjacent the outer and inner edges of the trough, a shaft mounted across between said posts to be capable of turning movement and located to be outside of the path of swinging movement of said gate, arms secured on said shaft at its ends and extending radially therefrom, links connected with the free ends of said arms and having pivotal connection with the gate below the mounting of the shaft, an operating lever secured on said shaft by which manual turning movement may be imparted to the shaft, means to engage with the lever to hold the same in an elevated position to retain the gate in the position in which it has the free edge thereof adjacent the outer edge of the trough, and adjustable means carried by one of said posts to limit swinging movement of the operating lever in a reverse direction to stop swinging movement of the gate when brought to have its free end adjacent the inner edge of the trough.

In testimony whereof I affix my signature in presence of two witnesses.

MICHAEL W. AHERN.

Witnesses:
A. O. KROGER,
HIRAM JOHNSON.

Copies of this patent may be obtained for five cents each, by addressing the "Commissioner of Patents, Washington, D. C."